United States Patent [19]

Moroz et al.

[11] 3,806,021

[45] Apr. 23, 1974

[54] PIPE CENTERING APPARATUS

[76] Inventors: Pavel Kirillovich Moroz, Volokolamskoe shosse, 1, kv. 17; Fedor Ignatievich Sloevsky, B. Cheremushkinskaya, 32, korpus 2, kv. 4; Genrikh Nikolaevich Strekalov, Graivoronovskaya, 8, korpus 1, kv. 161; Nikolai Lukich Kovalenko, 1 Mosfilmovsky prerulok, 16, kv. 48, all of Moscow; Vladimir Alexandrovich Kuznetsov, ulitsa Pobedy, 9, kv. 31, Khimki, Moskovskoi oblasti; Eijub Khabib Ogly Mekhtiev, ulitsa G. Gadzhieva, 1, kv. 55, Baku; Boris Isaakovich Levin, 3 Pryadilnaya ulitsa, 18a, kv. 79, Moscow; Ivan Egorovich Petrunin, Otradny proezd, 3-q, kv. 64, Moscow; Afanasy Grigorievich Lekanov, ulitsa Poletaeva, 32, korpus 1, kv. 200, Moscow; Vasily Ivanovich Baranov, Taganrogskaya, 6, kv. 45, stroenie 1, Moscow; Mamed Dzhavad Suleiman Ogly Kasum-Zade, ulitsa Gogolya, 5, kv. 7; Tofik Dzhalalovich Dashdamirov, ulitsa Zhdanova, 79, kv. 67, both of Baku, all of U.S.S.R.

[22] Filed: Mar. 17, 1972

[21] Appl. No.: 235,509

[52] U.S. Cl.............. 288/4, 29/200 P, 29/484, 219/59, 228/44
[51] Int. Cl............................................. B23k 37/04
[58] Field of Search............. 228/4, 6, 44; 29/200 P, 29/200 J, 484; 219/59, 60 A; 269/60

[56] References Cited

UNITED STATES PATENTS

| | | | |
|---|---|---|---|
| 2,463,907 | 3/1949 | Risley | 219/60 A |
| 2,749,421 | 6/1956 | Mikulak et al. | 228/45 X |
| 3,120,138 | 2/1964 | Ronay | 228/44 |
| 3,324,275 | 6/1967 | Peigneu | 228/4 |
| 3,566,505 | 3/1971 | Martin | 29/200 P |
| 3,566,507 | 3/1971 | Jocobsen | 228/4 X |

Primary Examiner—J. Spencer Overholser
Assistant Examiner—Robert J. Craig
Attorney, Agent, or Firm—Waters, Roditi, Schwartz & Nissen

[57] ABSTRACT

The apparatus comprises a carriage having mounted thereon a column supporting a pipe end jointing mechanism, the carriage being reciprocable together with the column. The column pivotably supports a cantilever member of which the free extremity pivotably supports the pipe end jointing mechanism including coaxially arranged grippers adapted to retain the ends of the pipes being jointed in a desired position.

4 Claims, 2 Drawing Figures

PIPE CENTERING APPARATUS

The invention relates to apparatus for jointing pipes, and, more particularly, it relates to apparatus for centering a pair of pipes prior to their being jointed.

The invention can be employed for jointing the pipes by either soldering or welding above the mouth of a well or a borehole; for soldering the pipes and tubing of thermal electric power stations both under shop conditions, when block units of such stations are prefabricated, and in situ; for soldering and welding the pipes of gas, oil, heat supply and other pipelines, etc.

The invention can be likewise employed for jointing pipes by means of threaded connections (both with and without threaded coupling sleeves).

Moreover, the invention can be employed successfully for centering and jointing various rod-like members of round, square and other cross-sectional shapes; e.g., for building up reinforcement bars in production of reinforced concrete structures.

There is known an apparatus for centering the ends of a pair of pipes to be jointed, comprising a carriage having mounted thereon a column supporting a pipe end jointing mechanism, said carriage being reciprocable together with said column.

The known apparatus further comprises a base supporting guides along which said carriage is adapted to reciprocate. Said column is rigidly secured on said carriage and has mounted thereon, also rigidly, the pipe end jointing mechanism including either pneumatically or manually actuated pipe grippers. Reciprocation of said carriage together with said column and said grippers is effected manually, when the pipe end jointing mechanism is to be retracted for placing a successive pipe to be jointed.

The said known apparatus has, however, the following shortcomings. This apparatus can be employed for centering the ends of the pips only when the latter have their axes occupy a specified position in space.

As the pipes are thus centered, the said known apparatus does not provide for rotation of one of the pipe ends to be jointed.

There are difficulties in checking up the said known apparatus and adjusting the same at the beginning of an operation and when the diameter of the pipes to be jointed is to be varied.

The said known apparatus cannot virtually be employed for jointing the ends of pipes that are but slightly bent; neither can it be employed for jointing pipes of which the axes are but slightly displaced from the abovementioned specified spacial position.

The above shortcomings limit the field of possible applications of the said known apparatus.

It is the main object of the present invention to create an apparatus for centering the ends of a pair of pipes prior to jointing the same, that should be capable of centering the pipes that are liable to have their axes occupy various positions in space (such as drillpipes and casings of oil, gas and other wells and boreholes; pipelines; the pipes and tubing of thermal power stations, etc.).

This and other objects are attained in an apparatus for centering a pair of pipes to be jointed, comprising a carriage having mounted thereon a column supporting a mechanism for jointing the ends of said pair of pipes, said carriage being reciprocable together with said column, in which apparatus, in accordance with the present invention, said column is mounted on said carriage for free rotation about the vertical axis thereof, said column supporting a cantilever member having one extremity thereof mounted on said column by means of a pivot providing for rotation of said cantilever member about a horizontal axis extending longitudinally of said cantilever member; the mechanism for jointing the ends of said pair of pipes being mounted on the free extremity of said cantilever member by means of another pivot providing for rotation of said mechanism about another horizontal axis perpendicular to said first-mentioned horizontal axis of rotation of said cantilever member, said mechanism including coaxially arranged grippers adapted to retain said free ends of said pair of pipes to be jointed in a desired position.

An apparatus constructed in accordance with the invention is thus capable of centering and jointing pipes of which the axes occupy various positions in space, the apparatus offering reliable performance, minimal adjustment time and, hence, greater effectiveness of operation.

It is advisable that said gripper for each said end of said pair of pipes should comprise a pair of pivotably mounted bell cranks, one free extremity of each said bell crank being adapted to contact said pipe, as it is being gripped, the other free extremity of each said bell crank pivotably supporting a jaw adapted to engage said pipe along the periphery thereof, said grippers being thus adapted to retain positively said ends of said pipes for jointing the same.

Said bell cranks can be associated with spring means biasing said jaws away from said pipes.

In order to provide for rotation of a pipe, as it is being gripped and centered, it is advisable that said jaws should have mounted therein ball bearing means contacting the periphery of said pipe.

The present invention will be further described in connection with an embodiment thereof, with reference being had to the accompanying drawings, wherein.

Figure 1:
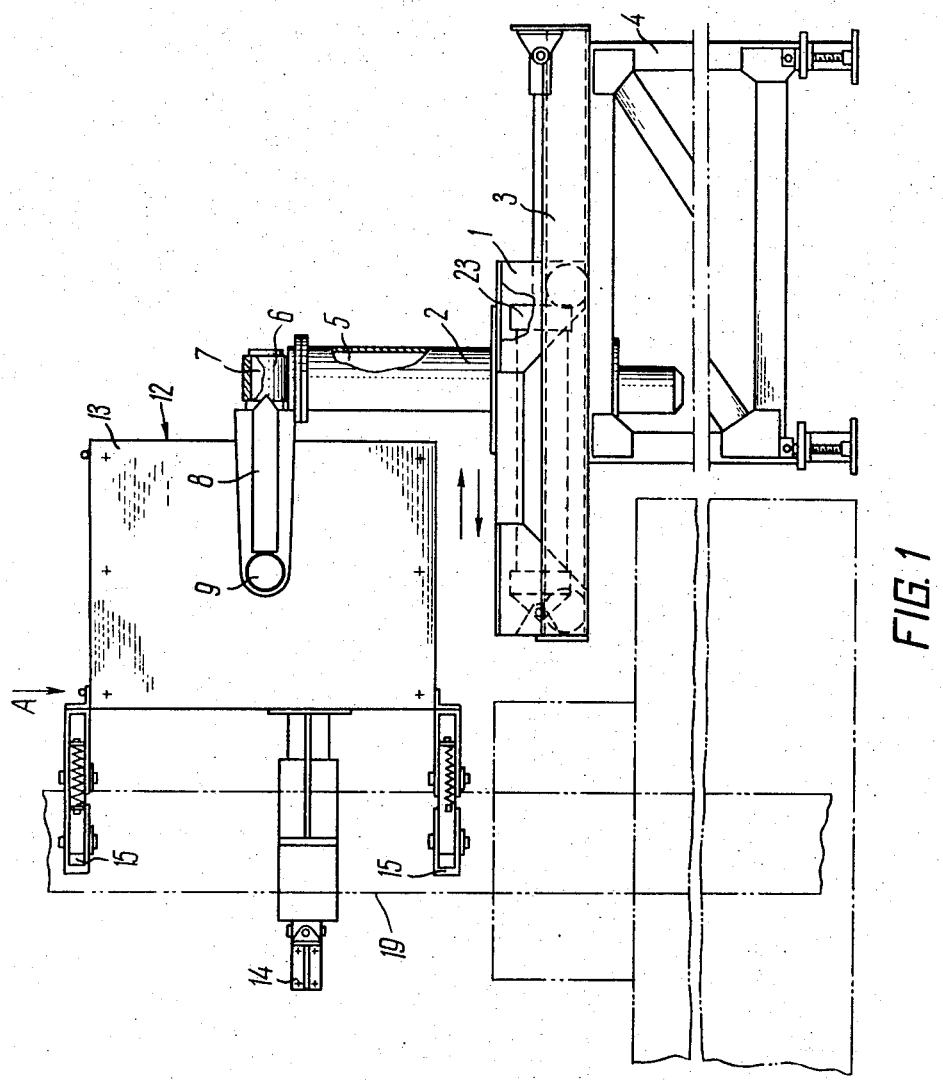
FIG. 1 is a partly longitudinally sectional general view of an apparatus embodying the present invention in the operational state thereof.

The apparatus for centering pipes prior to jointing the same, constructed in accordance with the invention, comprises a carriage 1 (FIG. 1) having mounted thereon a vertical column 2 for translation together with the carriage 1. The carriage can be reciprocated along guides 3 secured to the upright frame 4 of the apparatus. The column 2 is freely rotatable about the vertical axis 5 thereof, the column 2 being journalled in the carriage 1.

Figure 2:
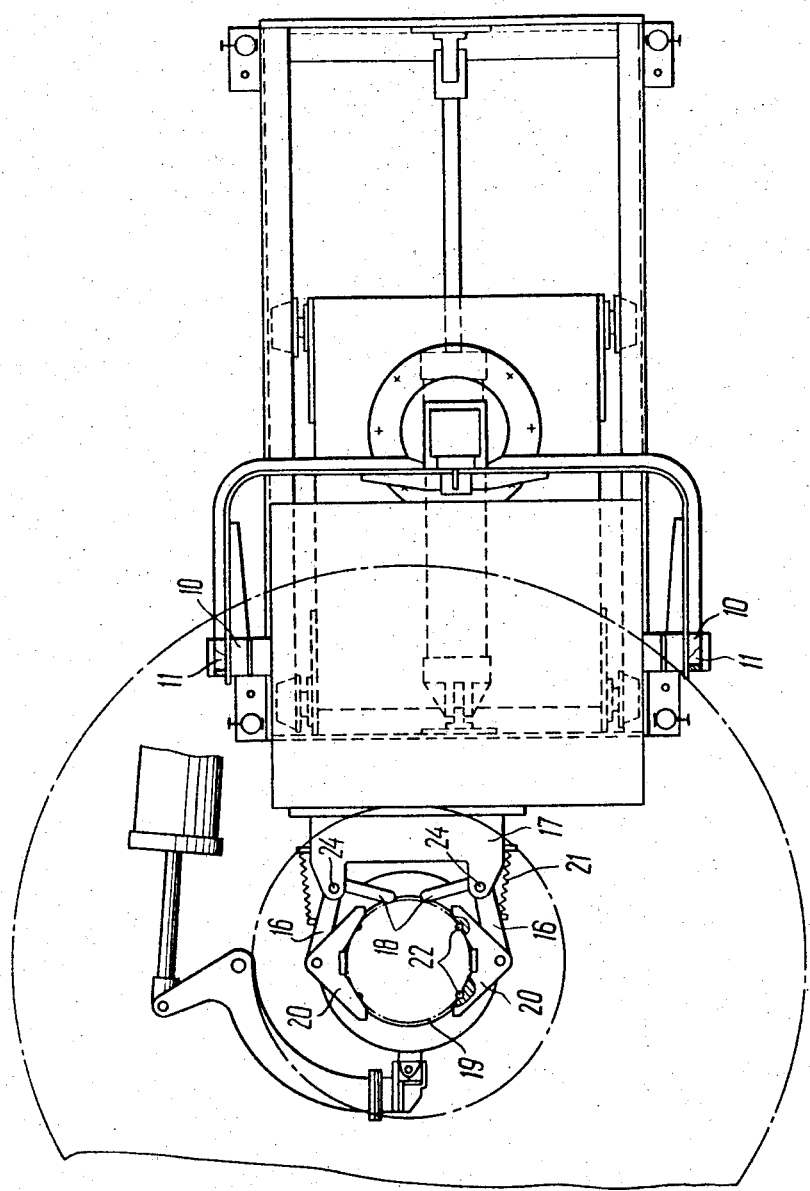
FIG. 2 is a view taken along arrow line "A" in FIG. 1.

A pivot 6 is mounted on the column 2, by means of which there is mounted a cantilever member 8 rotatable about its horizontal axis 7. The free extremity 9 of the cantilever member 8 carries a pivot 10 having a horizontal axis 11 perpendicular to the horizontal axis 7 of rotation of the cantilever member 8, the pivot 10 serving as the mounting of a pipe end jointing mechanism 12. The pipe end jointing mechanism 12 includes a power transformer 13 to which there are rigidly attached an inductor 14 and a pair of coaxially arranged catching grippers 15 for retaining the ends of the pipes being jointed. Each catching gripper 15 is an assembly including a pair of rotatable bell cranks 16 (FIG. 2) pivotably mounted on the housing 17 of the pipe end jointing mechanism 12. One free extremity 18 of each bell crank 16 is intended to bear against the pipe 19 being caught, while the other extremity pivotally supports a jaw 20 adapted to engage the pipe 19 along the periphery thereof and to retain the ends of the pipes 19 being jointed. The jaws 20 make it possible to employ the herein disclosed apparatus for jointing pipes of various diameters.

Disengagement of the jaws 20 from the pipes 19 after they have been jointed is effected with the help of springs 21, each spring 21 being connected between the housing 17 of the mechanism 12 and the respective one of the rotatable bell cranks 16.

The pipe 19 being caught and centered can be rotated about its axis, because the jaws 20 engaging the pipe 19 have in-built therein ball bearings 22.

The herein disclosed apparatus operates, as follows.

A carriage 1 together with the column 2 supported thereby is forwarded along the guides 3 secured to the upright frame 4 toward the ends of the pipes 19 to be jointed by means of a fluid pressure cylinder 23, e.g., an air cylinder. As the carriage 1 is this forwarded, the forwardly projecting extremities 18 of the bell cranks 16 pivotably mounted in the housing 17 of the respective catching grippers 15 contact the peripheries of the ends of the pipes 19 to be jointed, whereby the bell cranks 16 are rotated, and thus the respective jaws 20 pivotably mounted on the bell cranks 16 are brought toward the ends of the pipes 19 and engage their respective peripheries.

The pipe gripping effort is provided by the action of the air cylinder 23 and by the appropriate ratio of the effective lengths of the arms of the bell cranks 16. Possible misalignment of the respective vertical axes of the pipes 19 to be jointed is provided for by the horizontal travel of the carriage 1 and by the mechanism 12 being rotatable about the vetical axis 5. Moreover, should the pipes 19 be not strictly vertical, the centering thereof can be nevertheless performed, due to the presence of the pivots 6 and 10 enabling the mechanism 12 to be rotated, respectively, about the axes 7 and 11. Therefore, the provision of the three axes 5, 7 and 11 of rotation of the mechanism 12 enables the herein disclosed apparatus to center and joint the ends of pipes 19 extending in various directions in space.

After the ends of the now centered pipes 19 have been butt jointed, the air cylinder 23 is actuated in the reverse direction, and the springs 21 rotate the bell cranks 16, whereby the jaws 20 release the pipes 19.

The hereinabove described embodiment of the present invention exemplifies the use of the invention for jointing the ends of pipes above the mouth of a well. In this case the end of the lower pipe protruding from the well is the one that dictates the position of the pipes being jointed, whatever the direction of the axis of this lower pipe in space.

Should the axis of the pipes being jointed be either horizontal or inclined, which is often the case when various pipelines are mounted or laid, the pivots 2, 6 and 10 make it possible to attain any required position of the mechanism 12 in space, whereby the mechanism can be used for centering and jointing the pipes.

We claim:

1. An apparatus for centering vertically disposed pipes when jointing same, comprising a carriage capable of reciprocation in a horizontal plane; means for imparting said reciprocation to said carriage; a column capable of rotating about its axis of symmetry mounted on said carriage; a first pivot means secured by its horizontal axis to the upper portion of said column; a cantilever member mounted by its one end on said first pivot means for the rotation of said cantilever member about said horizontal axis of said first pivot means; a second pivot means secured by its horizontal axis to the free end of said cantilever member, said horizontal axis of the second pivot means being arranged normal to the horizontal axis of said first pivot means; a mechanism for jointing the ends of pipes being centered, mounted on said second pivot means for rotation about the horizontal axis of said second pivot means; a housing of said mechanism for jointing the ends of pipes being centered; a pair of gripper means for retaining the ends of pipes being centered, said pair of gripper means being secured on said housing and arranged coaxially with each other for locking in position the ends of pipes being centered relative to each other, said gripper means gripping the ends of pipes being centered upon the forward movement of said carriage.

2. An apparatus as claimed in claim 1, wherein each gripper means includes a pair of bell cranks; first pivot means secured in said housing of the mechanism for jointing the ends of pipes being centered and carrying one of said bell cranks; one end of each of said bell cranks contacting the gripped end of one of the pipes being centered; second pivot means carried by the other ends of said bell cranks; and jaws mounted on said second pivot means for gripping said pipe.

3. An apparatus as claimed in claim 2, including springs for biasing said jaws form the ends of pipes being centered, each of said springs being secured with its one end on said housing of the mechanism for jointing the ends of pipes being centered, the other end of each of said springs being on the jaw-carrying end of each of said bell cranks.

4. An apparatus as claimed in claim 2, including ball bearing means arranged in said jaws for imparting rotation and axial movement to the ends of pipes being centered when jointing said pipes.

* * * * *